US008778191B2

(12) United States Patent
Marelius (10) Patent No.: US 8,778,191 B2
(45) Date of Patent: Jul. 15, 2014

(54) FILTERING DEVICE AND A METHOD OF FILTERING A FLUID

(75) Inventor: Fredrick Marelius, Stockholm (SE)

(73) Assignee: Aqua Mundus AB, Tyreso (SE)

( * ) Notice: Subject to any disclaimer, the term of this patent is extended or adjusted under 35 U.S.C. 154(b) by 303 days.

(21) Appl. No.: 13/141,175

(22) PCT Filed: Dec. 22, 2008

(86) PCT No.: PCT/EP2008/068164
§ 371 (c)(1),
(2), (4) Date: Jun. 21, 2011

(87) PCT Pub. No.: WO2010/072249
PCT Pub. Date: Jul. 1, 2010

(65) Prior Publication Data
US 2011/0247989 A1    Oct. 13, 2011

(51) Int. Cl.
| B04B 7/16 | (2006.01) |
| B04B 7/14 | (2006.01) |
| B04B 9/04 | (2006.01) |
| B04B 9/06 | (2006.01) |
| B01D 63/16 | (2006.01) |
| B01D 61/06 | (2006.01) |
| B01D 61/08 | (2006.01) |
| C02F 9/08 | (2006.01) |
| C02F 1/38 | (2006.01) |
| C02F 1/44 | (2006.01) |

(52) U.S. Cl.
USPC ...... 210/781; 210/321.66; 210/652; 210/787; 210/806; 210/321.67; 210/321.78; 210/377; 210/380.1; 210/360.1; 494/37; 494/36; 494/49

(58) Field of Classification Search
USPC ............ 210/321.67, 321.68, 321.84, 321.75, 210/321.87, 321.78, 360.1, 369, 371, 377, 210/380.1, 787, 806, 801, 649–652, 210/780–782, 321.66; 494/49–52, 24, 44, 494/36–37
See application file for complete search history.

(56) References Cited

U.S. PATENT DOCUMENTS 550,073 A * 11/1895 Isaacs ........................... 210/781
(Continued)

FOREIGN PATENT DOCUMENTS

| DE | 3112647 | 10/1982 |
| GB | 1603746 | 11/1981 |

(Continued)

OTHER PUBLICATIONS

International Search Report, Intl. Application No. PCT/EP2008/068164, Date Mailed May 20, 2009.

*Primary Examiner* — David C Mellon
(74) *Attorney, Agent, or Firm* — MKG, LLC (57) ABSTRACT

The invention concerns a centrifugal filtering device for filtering a fluid. The device comprises a rotatable inner casing forming an inner space and a rotatable outer casing forming an outer space. The device further comprises a fluid inlet, at least one filter and drive means. The drive means is configured to rotate the inner casing to create a centrifugal pressure. The pressure forces a part of the fluid contained in the inner space through the filter and to a radially outer position of the outer space. The filtered fluid forms a filtrate, the filtrate having a kinetic energy. The outer casing is configured to transport the filtrate from the radially outer position to a radially inner position of the outer space, permitting transfer of the kinetic energy from the filtrate to the outer casing, thereby permitting regaining of mechanical energy.

5 Claims, 4 Drawing Sheets

(56) References Cited

U.S. PATENT DOCUMENTS

| | | | |
|---|---|---|---|
| 3,567,030 A | | 3/1971 | Loeffler et al. |
| 3,669,879 A | | 6/1972 | Berriman |
| 4,230,564 A | * | 10/1980 | Keefer ............ 210/652 |
| 4,406,791 A | * | 9/1983 | Khapaev ............ 210/649 |
| 6,713,028 B1 | * | 3/2004 | Oklejas, Jr. ............ 422/209 |

FOREIGN PATENT DOCUMENTS

| | | |
|---|---|---|
| WO | 9836823 | 8/1998 |
| WO | 0043096 | 7/2000 |

* cited by examiner

FILTERING DEVICE AND A METHOD OF FILTERING A FLUID

FIELD OF THE INVENTION

The present invention concerns a centrifugal filtering device for filtering a fluid, wherein the centrifugal filtering device comprises an inner casing forming an inner space with an inner pressure and an outer casing forming an outer space with an outer pressure, wherein the inner casing and the outer casing are rotatable around a central axis extending through the inner casing and the outer casing, a fluid inlet configured to permit feeding of the fluid into the inner space, at least one filter being located between the inner space and the outer space, and drive means configured to rotate the inner casing at a first rotational speed in the inner space to create a centrifugal pressure forcing at least a part of the fluid from the inner space through the filter and to a radially outer position of the outer space, the filtered fluid forming a filtrate and the non-filtered fluid forming a concentrate, the filtrate having a rotating movement and a kinetic energy. The invention also refers to a method of filtering a fluid.

BACKGROUND

Water is essential for the survival of all known forms of life and 71% of the earth's surface is covered by water, sea water constituting 97% of the total amount of water. Sea water, containing dissolved salts of different chemical compositions, mostly sodium chloride, must be desalinated in order to meet the demand of fresh water from the world. However, there is a large and growing demand for fresh water in many parts of the world. Known technologies for meeting this demand are for example conventional reverse osmosis and centrifugal reverse osmosis.

Conventional reverse osmosis of sea water involves a process wherein the sea water is filtered through a reverse osmosis filter at a high pressure, for example 6-8 MPa. A high pressure feeding pump is required to force the sea water through the filter. Normally, only a part of the sea water is forced through the filter, the major part of the sea water remaining non-filtered. The non-filtered sea water, the concentrate, maintains its high pressure as it is discharged from the device.

Conventional reverse osmosis of sea water has several disadvantages, one of these being the known unreliability of the high pressure feeding pumps as they are often subjected to corrosion and wear problems. However, the principal disadvantage of the conventional reverse osmosis process is the energy being wasted due to the discharge of the high pressure concentrate. Conventional reverse osmosis devices with the extra function of recovering some of this wasted energy are known, however not wide spread due to the additional cost and complexibility.

Centrifugal reverse osmosis is a relatively new technology. In a centrifugal reverse osmosis filtering device the pressure required for forcing the sea water through the reverse osmosis filter is created within a rotating centrifuge body instead of using the above mentioned high pressure feeding pump. The sea water is fed into the center of the rotating centrifuge body at a low pressure and is forced to flow radially outwards and consequently subjected to the influence of the centrifugal force, thereby obtaining a high pressure. A reverse osmosis filter is located in the radially outer region of the centrifuge body and part of the high pressure sea water is forced through the filter. The filtrated fresh water, the filtrate, may be discharged at the periphery of the centrifugal body and the concentrate returns to the center of the centrifugal body to be discharged, thereby regaining its low pressure.

The centrifugal reverse osmosis process does not have the above mentioned disadvantages of a conventional reverse osmosis process. The energy of the high pressure concentrate is not wasted but recovered by the device and no extra function for recovering the waste energy is needed. Furthermore, since no high pressure feeding pump or high pressure pipes are required, the problem of corrosion and wear is less serious. This renders the centrifugal reverse osmosis process a more reliable process for the filtration of sea water into fresh water.

There are several known devices for using the centrifugal reverse osmosis process. For example, WO 98/36823 discloses a centrifugal system for reverse osmosis comprising additional functions for recovering energy also from the filtrate. Kinetic energy from the filtrate is recovered by means of a crown of blades or a spiral shell when discharging the filtrate. Kinetic energy from the filtrate is transferred to the crown of blades and a transmission transforms the kinetic energy into mechanical energy, or the kinetic energy is recovered in the form of pressure by means of the spiral shell which is capable of capturing the rotational flow of the filtrate.

SUMMARY OF THE INVENTION

One object of the present invention is to obtain a centrifugal filtering device having an improved capability of regaining energy.

In an embodiment of the present invention, a centrifugal filtering device includes an outer casing configured to transport the filtrate from the radially outer position of the outer space to a radially inner position of the outer space. The outer casing is further configured to permit transfer of the kinetic energy from the filtrate to the outer casing, thereby permitting of mechanical energy.

Such a centrifugal filtering device recovers kinetic energy from the filtrate by means of the design of the outer wall of the rotating centrifuge body in an efficient manner. The centrifugal filtering device disclosed herein thus uses lower energy by recovering kinetic energy from the concentrate as well as from the filtrate.

Mechanical energy is regained by transporting the filtrate from a radially outer position to a radially inner position before discharging the filtrate. The inner position of the outer space is thus located closer to the central axis than the outer position of the outer space. For example, mechanical energy can be regained by boundary friction from the filtrate against the outer casing, the kinetic energy of the filtrate thereby being transferred to the outer casing.

Preferably, the inner and the outer casing are axi-symmetric. However, the inner and the outer casing do not have to be axi-symmetric. The inner and the outer casing may have any cross sectional shape.

According to an embodiment, the inner position is located in the proximity of the central axis.

According to an embodiment, the centrifugal filtering device further comprises walls attached to the outer casing and located in the outer space, the walls being configured to enhance the transfer of the kinetic energy from the filtrate to the outer casing. The walls assist in decelerating the rotating movement of the filtrate during the transport of the filtrate from the radially outer position to the radially inner position. The kinetic energy may thereby be transferred from the filtrate to the outer casing more efficiently.

According to an embodiment, the centrifugal filtering device further comprises a filtrate outlet configured to permit discharging of the filtrate from the outer space, the filtrate outlet being located at the radially inner position.

According to an embodiment, the centrifugal filtering device further comprises a concentrate outlet configured to permit discharging of the concentrate from the inner space, the central axis extending through the concentrate outlet. The centrifugal filtering device may for example comprise a hollow inner axle. The inner axle may comprise both the fluid inlet and the concentrate outlet.

According to an embodiment, the outer casing has a tapered shape with a widest portion and a narrowest portion, the radially outer position being located in the proximity of the widest portion and the radially inner position being located in the proximity of the narrowest portion. Preferably, the outer casing has the shape of or approximately the shape of a cone, the cone being located upside down when the centrifugal filtering device is in operation. Preferably, the radius of the outer casing decreases continuously from the radially outer position to the radially inner position, the outer casing forming an angle with the central axis.

According to an embodiment, the filter is a reverse osmosis filter.

According to an embodiment, the centrifugal filtering device is configured so that the central axis extends in a substantially vertical direction when the centrifugal filtering device is in operation, the radially outer position thereby being located at a relatively high level and the radially inner position being located at a relatively low level with respect to the vertical direction.

According to an embodiment, the drive means is connected to the inner casing. The drive means is thereby able to rotate the inner casing about the central axis.

According to an embodiment, the outer casing is connected to the inner casing. Advantageously, the outer casing is mechanically connected to the outer casing. The outer casing may be fixed relative the inner casing, the outer casing thereby rotating at the same rotational speed as the inner casing.

According to an embodiment, the outer casing is connected to a member configured for said regaining of mechanical energy from the outer casing.

According to a further embodiment, the member comprises a transmission mechanism connected to the inner casing and the outer casing, thereby permitting the outer casing to rotate at a second rotational speed, the first rotational speed being greater than the second rotational speed. By rotating the outer casing at a lower rotational speed than the inner casing, energy losses due to friction against the air may be reduced. The transmission mechanism is configured to permit transfer of the regained mechanical energy from the outer casing to the inner casing. As described above, a significant part of the mechanical energy that is lost when rotating the inner casing may thereby be regained.

According to a further embodiment, the member comprises a transmission mechanism and an electrical generator connected to the outer casing via the transmission mechanism. The electrical generator permits the regaining of mechanical energy from the outer casing by converting the mechanical energy into electrical energy. The electrical energy may then be stored for usage in other applications or the electrical energy may be converted into mechanical energy by the drive means. The mechanical energy is in the latter case transferred to the inner casing, thereby regaining to the centrifugal filtering device some of the mechanical energy that is lost when rotating the inner casing.

According to a further embodiment, the filter is a part of the inner casing. There may be more than one filter placed at different radiuses between the inner and the outer casing. It is possible to incorporate all of these filters into the inner casing, resulting in all filters being a part of the inner casing. The filters are arranged to permit transportation of the non-filtered fluid from each filter towards the concentrate outlet where the concentrate is discharged.

According to a further embodiment, the centrifugal filtering device further comprises at least one opening to the surrounding air configured to equalize the outer pressure inside the outer casing with the atmospheric pressure. Preferably, when the centrifugal filtering device is in operation the openings are located on the upper part of the outer casing with respect to the vertical direction.

According to an embodiment, the method further comprises rotating the outer casing at a second rotational speed, the first rotational speed being greater than the second rotational speed.

According to an embodiment, the method further comprises rotating the outer casing at the same rotational speed as the inner casing, and operating the device with intermittent rotational speeds ranging between a high rotational speed that produces a centrifugal force sufficient to force the fluid through the filter, and a low rotational speed sufficiently low for the filtrate to flow from the radially outer position of the outer space towards the radially inner position of the outer space, the mechanical energy thereby being regained during a reduction of rotational speed from the high rotational speed to the low rotational speed by means of an electrical generator or a mechanical regulation of the rotational speed.

According to a further embodiment, the fluid to be filtrated by the centrifugal filtering device is an aqueous salt solution. The aqueous salt solution may be salty sea water.

The fluid to be filtrated by the centrifugal filtering device may thus be an aqueous salt solution such as sea water. However, it is to be noted that the centrifugal filtering device of the invention is not limited to filtering the above mentioned aqueous salt solution.

Advantageously, other fluids in need of filtration may be filtrated by the centrifugal filtering device of the invention, the device having the advantage of an improved capability of regaining energy compared to other known centrifugal filtering devices.

DETAILED DESCRIPTION OF VARIOUS EMBODIMENTS OF THE INVENTION

It is to be noted that elements having the same function have been designated with the same reference signs in the embodiments.

A first embodiment of a centrifugal filtering device will now be described with reference to FIG. 1. The centrifugal filtering device comprises an inner casing 1. The inner casing 1 forms an inner space 2 with an inner pressure. Outside the inner casing 1 an outer casing 3 is located. The outer casing 3 comprises one or more openings 4, forming air vents to the surrounding air. The outer casing 3 forms an outer space 5 outside the inner casing 1. The outer space 5 comprises a radially outer position, or region, 6 and a radially inner position, or region, 7. Furthermore, the outer space 5 has an outer pressure. The inner casing 1 is connected to and provided around an inner axle 8. The inner axle 8 is hollow, permitting a fluid to flow through the inner axle 8. The inner axle 8 comprises a blocking wall 9. The blocking wall 9 extends through the inner axle 8 and preferably out into the inner space 2. Furthermore, the inner axle 8 has openings 10 to the inner space 2. The inner casing 1 is via the inner axle 8 connected to a drive means DM. The outer casing 3 is connected to and provided around an outer axle 11 comprising or consisting of two segments 111 and 112. The outer axle 11 is hollow and provided concentrically outside the inner axle 8. The outer axle 11 is connected to the inner axle 8 by bearings 12 permitting the outer axle 11 and the outer casing 3 to rotate relatively to the inner axle 8 and the inner casing 1. A central axis X extends through the inner casing 1 and the outer casing 3. The inner casing 1 and the outer casing 3 are rotatable around the central axis X. When the centrifugal filtering device is in operation, the central axis X extends in a substantially vertical direction. The centrifugal filtering device has an upper end and a lower end with respect to the vertical direction. A fluid inlet 13 is located in the proximity of the upper end.

Via the two segments 111 and 112, the outer axle 11 is configured to permit the inner casing 1 to be directly connected to the inner axle 8. Thus, the two segments 111 and 112 are connected to the inner axle 8 at positions above and below the inner casing 1. The inner casing 1 is thereby able to rotate at a first rotational speed. The outer casing 3, provided outside the inner casing 1, is connected to the two segments 111 and 112 of the outer axle. The outer casing 3 is thereby able to rotate at a second rotational speed.

The outer casing 3 is connected to a member 14 that is configured for regaining of mechanical energy from the outer casing 3.

A filter 15 is located between the inner space 2 and the outer space 5. The filter 15 is integrated with the inner casing 1, thereby being a part of the inner casing 1. The filter 15 may be a semi permeable filter permitting the passage of fluid but not particles. Preferably, the filter 15 is a reverse osmosis filter.

When operating the centrifugal filtering device, a fluid F to be filtrated is fed into the hollow inner axle 8 through the fluid inlet 13. From the inner axle 8, the fluid F is led through the openings 10 into the inner space 2. The blocking wall 9 inside the inner axle 8 is configured to lead the fluid F from the inner axle 8 into the inner space 2. The fluid F is thereby forced to enter the inner space 2 and may not be transported straight through the inner axle 8. The drive means DM rotate the inner casing 1 at a first rotational speed to create a centrifugal pressure. The centrifugal pressure forces at least a part of the fluid F from the inner space 2 through the filter 15 and into the outer space 5. The outer casing 3 is rotated at a second rotational speed. Via the openings 4, the outer pressure in the outer space 5 is equalized with the atmospheric pressure outside the outer casing 3.

The filtered fluid forms a filtrate $F_I$. The filtrate $F_I$ flows down the outer casing 3 due to the force of gravity. The filtrate $F_I$ has a rotating movement and a kinetic energy. The outer casing 3 comprises a filtrate outlet 16 in the proximity of the central axis X. The filtrate $F_I$ is discharged from the centrifugal filtering device through the filtrate outlet 16.

The part of the fluid F that is not forced through the filter, i.e. non-filtered fluid, forms a concentrate C. The concentrate C is led back into the hollow inner axle 8 through the openings 10. The blocking wall 9 prevents the concentrate C to be forced upwards through the inner axle 8 towards the fluid inlet 13. The inner casing 1 comprises a concentrate outlet 17 in the proximity of the central axis X The blocking wall 9 guides the concentrate C from the inner space 2 through the inner axle 8 towards the concentrate outlet 17. The concentrate C is discharged from the centrifugal filtering device through the concentrate outlet 17.

The filtrate $F_I$ is transported from the radially outer position 6 of the outer space 5 to the radially inner position 7 of the outer space 5. The radially inner position 7 is located closer to the central axis X than the radially outer position 6. Preferably, the radially inner position 7 is located in the proximity of the central axis X. The outer casing 3 has a tapered shape with a widest portion and a narrowest portion, the radially outer position 6 being located in the proximity of the widest portion and the radially inner position 7 being located in the proximity of the narrowest portion. Preferably, the outer casing 3 has approximately the shape of a cone, the cone being located upside down when the centrifugal filtering device is in operation. The radius of the outer casing 3 decreases from the radially outer position 6 to the radially inner position 7, the outer casing 3 forming an angle $\alpha$ with the central axis X. In order for the filtrate $F_I$ to flow down the outer casing 3, the angle $\alpha$ must be sufficiently low. The outer casing 3 is configured so that the angle $\alpha$ permits the force of gravity to be larger than the vertical component of the centrifugal force, thereby permitting the filtrate $F_I$ to flow down the outer casing 3. When the filtrate $F_I$ flows down the outer casing 3, the radius of the outer space 5 decreases and the rotating movement of the filtrate $F_I$ will strive to increase. However, the increase of the rotating movement of the filtrate $F_I$ will be counteracted by friction against the outer casing 3. Kinetic energy from the filtrate $F_I$ will thereby be transferred to the outer casing 3 and mechanical energy will be regained to the centrifugal filtering device. In the embodiments disclosed, the radius of the outer casing decreases continuously. However, it is possible to let the radius decrease discontinuously, for instance stepwise.

Figure 1:
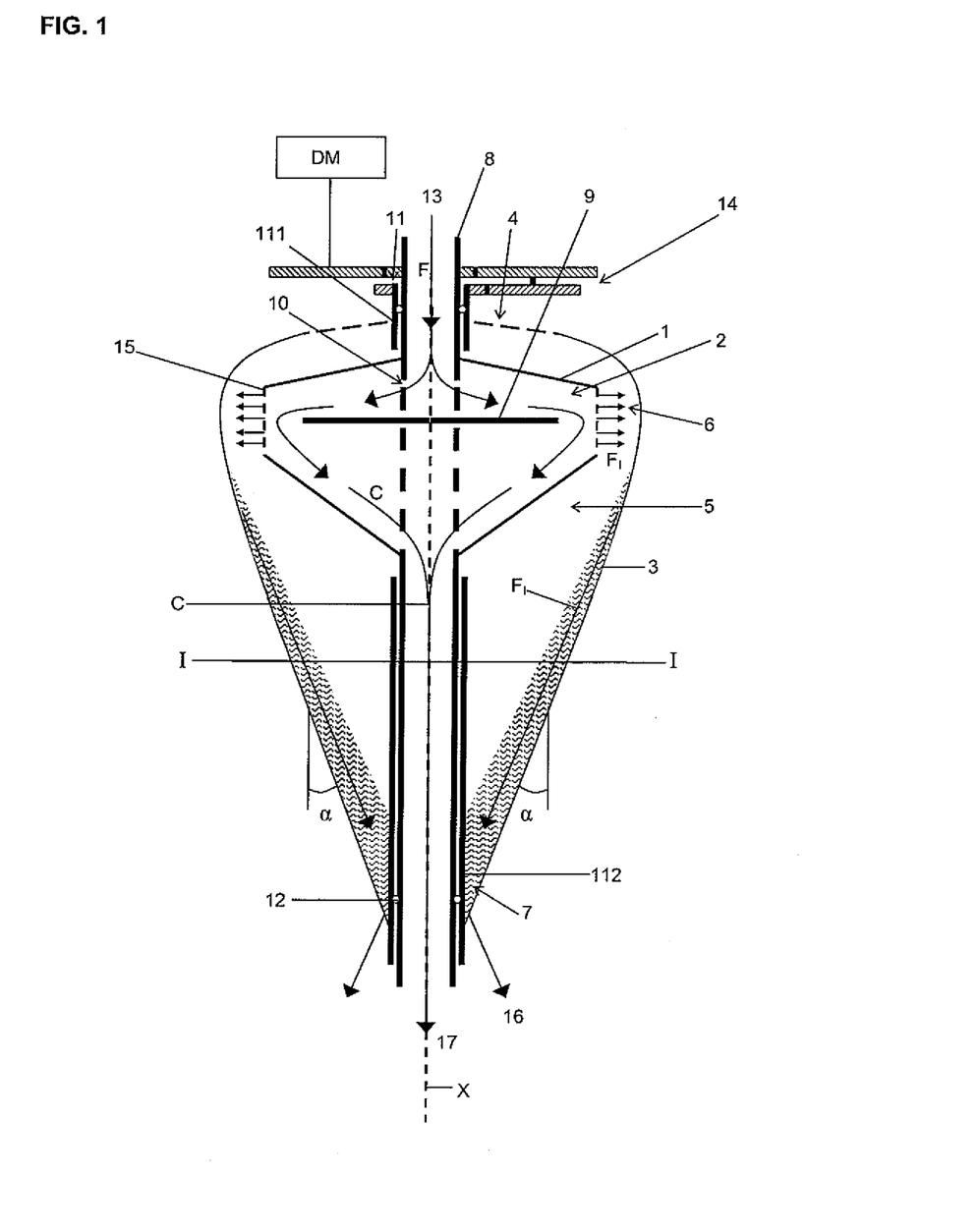
FIG. 1 shows a schematic view of a first embodiment of a centrifugal filtering device according to the invention.
Figure 3:
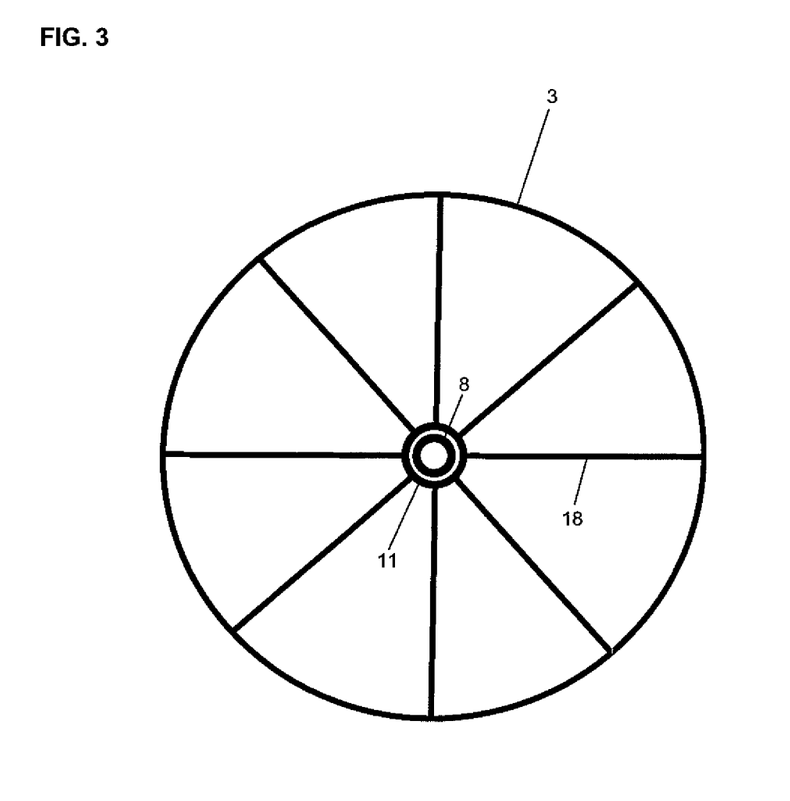
FIG. 3 shows a schematic view of walls in the centrifugal filtering device according to FIG. 1, FIG. 2 or FIG. 4 along the section I-I.

Optionally, walls 18 can be attached to the outer casing 3 and located in the outer space 5, see FIG. 3 showing a schematic view of the walls in the centrifugal filtering device according to FIG. 1 along the section I-I. Furthermore, walls 18 according to FIG. 3 may also be attached to the inner casing 1 and located in the inner space 2. The walls 18 are configured to enhance the transfer of the kinetic energy from the filtrate $F_I$ to the outer casing 3. The walls 18 counteract the increase of the rotating movement of the filtrate $F_I$ as the filtrate $F_I$ is transported from the radially outer position 6 to the radially inner position 7. Kinetic energy from the filtrate $F_I$ may thereby be transferred to the outer casing 3 and be regained as mechanical energy more efficiently.

In this first embodiment of the invention, the member 14 comprises a transmission mechanism. The transmission mechanism consists of or comprises a gear box. However, any suitable transmission mechanism can be used, for instance an arrangement of pulleys and belts. The gear box is configured to permit transfer of the regained mechanical energy from the outer casing 3 to the inner casing 1. As described above, some of the mechanical energy that is lost when rotating the inner casing 1 is thereby regained. The configuration of the gear box and the presence of the bearings 12 allows the inner casing 1 to rotate at a first rotational speed being greater than the second rotational speed of the outer casing 3. By rotating the outer casing 3 at a lower rotational speed than the inner casing 1, energy may be further conserved by the device since energy losses due to friction of the outer casing 3 against the air are less than if the outer casing 3 is rotated at the same rotational speed as the inner casing 1.

Figure 2:
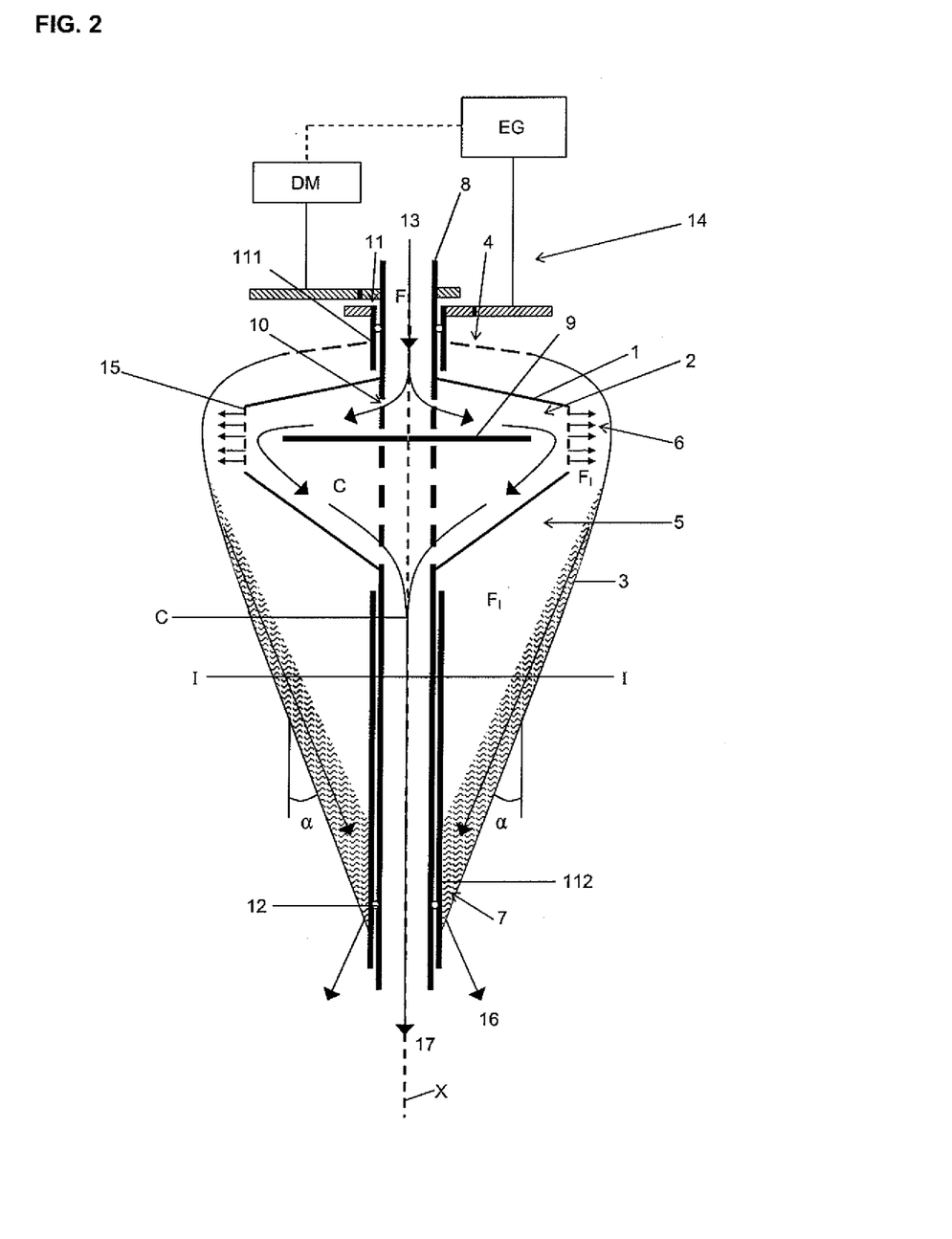
FIG. 2 shows a schematic view of a second embodiment of a centrifugal filtering device according to the invention.

FIG. 2 discloses a second embodiment of the centrifugal filtering device of the kind disclosed in FIG. 1 of the first embodiment, which differs from the first embodiment in that the member 14 comprises or consists of a transmission mechanism and an electrical generator EG.

The electrical generator EG is connected to the outer casing 3 via the transmission mechanism. The electrical generator EG converts the mechanical energy regained by the outer casing 3 into electrical energy. The electrical energy may then be stored for usage in other applications or the electrical energy may be converted into mechanical energy by the drive means DM. The mechanical energy may then be transferred to the inner casing 1, thereby regaining some of the mechanical energy to the centrifugal filtering device that is lost when rotating the inner casing 1. By extracting energy from the rotation of the outer casing 3, the electrical generator EG allows the outer casing 3 to rotate at a second rotational speed, the second rotational speed being lower than the first rotational speed.

It is to be noted that the gear box of the first embodiment or the electrical generator EG of the second embodiment may be replaced by any other device that restrains the rotation of the outer casing 3 by extracting energy from the rotation of the outer casing 3.

In the embodiments disclosed, the inner casing 1 and the outer casing 3 are axi-symmetric. However, the inner casing 1 and the outer casing 3 do not have to be axi-symmetric. The inner casing 1 and the outer casing 3 may have any cross sectional shape provided that the kinetic energy may be regained by transporting the filtrate $F_I$ from a radially outer position 6 to a radially inner position 7 before discharging the filtrate $F_I$.

Figure 4:
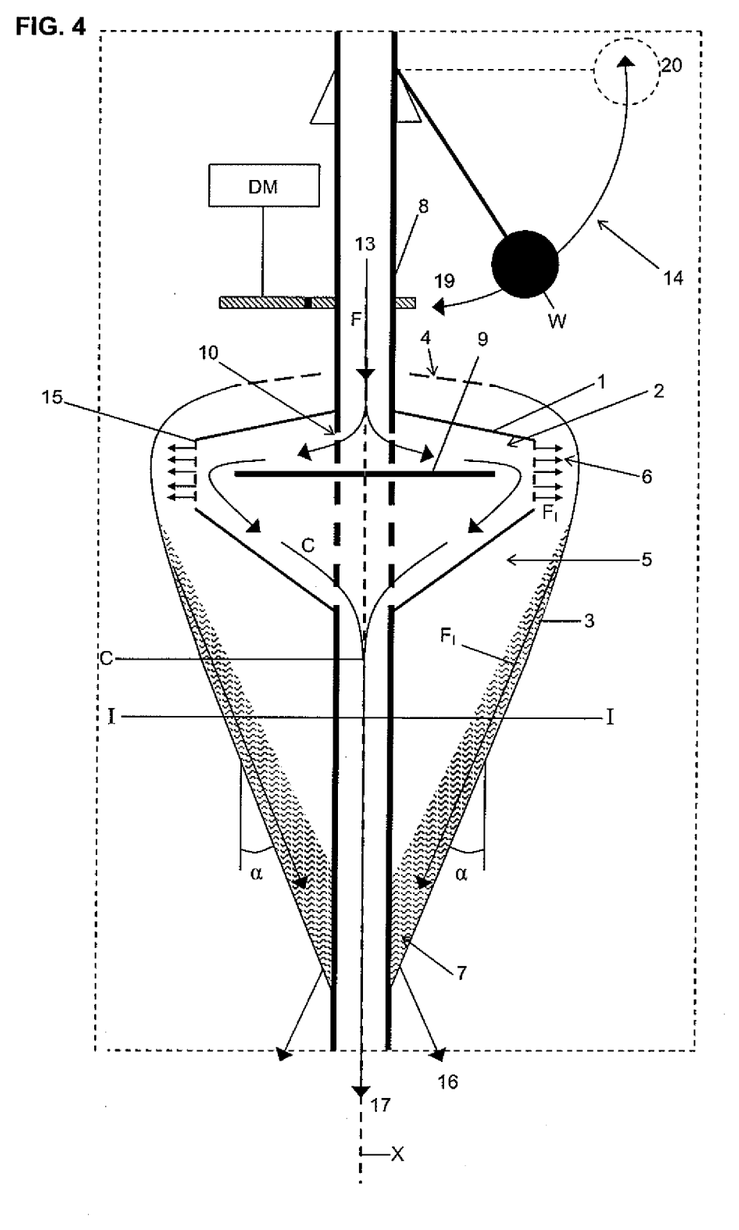
FIG. 4 shows a schematic view of a third embodiment of a centrifugal filtering device according to the invention.

FIG. 4 discloses a third embodiment of the centrifugal filtering device of the kind disclosed in FIG. 1 of the first embodiment, which differs from the first embodiment in that the device does not comprise the outer axle 11, and, consequently the device does not comprise any bearings 12. Furthermore, the method of operating the centrifugal filtering device is different from the first embodiment.

The inner casing 1 and the outer casing 3 are connected to the inner axle 8. Thereby, the outer casing 3 is fixed relative the inner casing 1. The inner casing 1 and the outer casing 3 are connected to the drive means DM. The drive means DM rotate the inner casing 1 and the outer casing 3 at the same rotational speed. The fluid F to be filtrated is fed through the fluid inlet 13 and into the hollow inner axle 8. Furthermore, the fluid F is transported into the inner space 2 through the openings 10 of the inner axle 8. The rotation of the inner casing 1 creates a centrifugal pressure. The centrifugal pressure forces at least a part of the fluid F from the inner space 2 through the filter 15 and into the outer space 5. The filtered fluid forms a filtrate $F_I$. The filtrate $F_I$ flows down the outer casing 3 due to the force of gravity. The part of the fluid F that is not forced through the filter, i.e. non-filtered fluid, forms a concentrate C. The concentrate C is led back into the hollow inner axle 8 through the openings 10. The inner casing 1 has a concentrate outlet 17 in the proximity of the central axis X. The outer casing 3 has a filtrate outlet 16 in the proximity of the central axis X.

The filtrate $F_I$ is kept inside the outer space 5, i.e. the filtrate $F_I$ is not discharged, until a certain volume of the filtrate $F_I$ has been collected inside the outer space 5. When the certain volume of filtrate $F_I$ has been collected, the rotational speed of the inner casing 1 and the outer casing 3 is decreased. The filtrate $F_I$ and the concentrate C can now be discharged from the centrifugal filtering device through the filtrate outlet 16 and the concentrate outlet 17, respectively. The filtrate $F_I$ and the concentrate C exit due to the force of gravity.

The decrease of the rotational speed is obtained in a manner wherein the kinetic energy of the filtrate $F_I$ is regained, the method thereby being energy efficient. The outer casing 3 is connected to a member 14 that is configured for regaining of mechanical energy from the outer casing 3. In this fourth embodiment, the member 14 comprises or consists of an arrangement comprising a weight or weights W. The decrease of the rotational speed can for example be obtained by moving the weight W attached to the inner axle 8 and the outer axle 11 from a first oscillating radius 19 to a second oscillating radius 20, the second oscillating radius 20 being larger than the first oscillating radius 19. The rotational speed will decrease whilst the moment of inertia is conserved and the filtrate $F_I$ can flow down the outer casing 3 and may be discharged through the filtrate outlet 16. Kinetic energy of the filtrate $F_I$ is thereby transferred to the weight W and regained as mechanical energy. When the outer space 5 has been emptied, the weight W is moved back towards the first oscillating radius 19, thereby increasing the rotational speed of the inner casing 1 and the outer casing 3. The increased rotational speed of the inner casing 1 and the outer casing 3 again creates a centrifugal pressure, resuming the centrifugal filtering process of the fluid F. The movable weight or weights W may advantageously be incorporated in a conventional flywheel.

Optionally, the decrease of the rotational speed can be obtained by connecting an electrical generator (not shown) to the centrifugal filtering device or by using an electrical motor (not shown) that also functions as a generator. The electrical energy produced during the decrease of the rotational speed may be converted into mechanical energy and transferred to the centrifugal filtering device, or it may be used for other purposes, for example to increase the rotational speed of a second unit or to be stored in batteries.

Since the outer casing 3, and possibly further components such as the weight W, rotate at a certain rotational speed, energy loss due to air friction may be avoided by operating the device in an environment were air is evacuated or replaced by a lighter gas producing less friction than air.

It is to be noted that the embodiment according to FIG. 4 optionally may comprise both an inner axle 8 and an outer axle 11. However, since the inner casing 1 and the outer casing 3 are rotated at the same rotational speed, the outer axle 11 may be fixed to the inner axle 8. Consequently, no bearings 12 are needed in the connection between the inner axle 8 and the outer axle 11.

The filter 15 of the above embodiments may be regularly cleaned. The cleaning is obtained by flushing of the filter 15. First, the filtrate outlet 16 is closed and the outer casing 3 is filled with the filtrate $F_I$, i.e. filtered "clean" fluid. Thereafter, the fluid inlet 13 is closed so that no more fluid F can be fed into the inner space 2. Whilst the inner and the outer spaces 2,4 are still filled with fluid F and filtrate $F_I$, respectively, the rotation of the inner and the outer casing 1,3 is stopped. The filter 15 will then be subjected to a pressure that is directed inwards due to the water column in the inner axle 8 on the concentrate outlet 17 side. The filtrate $F_I$ will flush through the filter 15 from the outer space 5 towards the inner space 2. The magnitude of the pressure is governed by the height of the fluid column in the inner axle 8 on the concentrate outlet 17 side of the device.

The present invention is not limited to the shown embodiments but can be varied and modified within the scope of the following claims.

The invention claimed is:

1. A method of filtering a fluid by means of a centrifugal filtering device, in which the device comprises an inner casing forming an inner space with an inner pressure and an outer casing forming an outer space with an outer pressure, wherein the inner casing and the outer casing are rotatable around a central axis extending through the inner casing and the outer casing, a fluid inlet configured to permit feeding of the fluid into the inner space, and at least one filter being located between the inner space and the outer space, wherein the method comprises:

feeding a fluid to be filtered into the inner space by means of the fluid inlet;
   rotating the inner casing at a first rotational speed, thereby creating a centrifugal pressure forcing at least a part of the fluid from the inner space through the filter and to a radially outer position of the outer space, the filtered fluid forming a filtrate and the non-filtered fluid forming a concentrate, the filtrate having a rotational movement and a kinetic energy;
   transporting the filtrate from the radially outer position of the outer space to a radially inner position of the outer space, wherein the transporting of the filtrate from the radially outer position of the outer space to the radially inner position space transfers the kinetic energy from the filtrate to the outer casing, thereby permitting regaining of mechanical energy, and
   discharging the filtrate and the concentrate from the centrifugal filtering device.

2. A method according to claim 1, wherein the method further comprises rotating the outer casing at a second rotational speed, the first rotational speed being greater than the second rotational speed.

3. A method according to claim 1, wherein the method further comprises rotating the outer casing at the same rotational speed as the inner casing, and operating the device with intermittent rotational speeds ranging between:

a high rotational speed that produces a centrifugal force sufficient to force the fluid through the filter, and
   a low rotational speed sufficiently low for the filtrate to flow from the radially outer position of the outer space towards the radially inner position of the outer space;
   at least a portion of the regaining of mechanical energy is regained during a reduction of rotational speed from the high rotational speed to the low rotational speed by means of an electrical generator or a mechanical regulation of the rotational speed.

4. A method according to claim 1, wherein the fluid to be filtered by the centrifugal filtering device is an aqueous salt solution.

5. A method of filtering a fluid by means of a centrifugal filtering device, in which the device comprises an inner casing forming an inner space with an inner pressure and an outer casing forming an outer space with an outer pressure, wherein the inner casing and the outer casing are rotatable around a central axis extending through the inner casing and the outer casing, a fluid inlet configured to permit feeding of the fluid into the inner space, and at least one filter being located between the inner space and the outer space, wherein the method comprises:

feeding a fluid to be filtered into the inner space by means of the fluid inlet;
   rotating the inner casing at a first rotational speed, thereby creating a centrifugal pressure forcing at least a part of the fluid from the inner space through the filter and to a radially outer position of the outer space, the filtered fluid forming a filtrate and the non-filtered fluid forming a concentrate, the filtrate having a rotational movement and a kinetic energy;
   transporting the filtrate from the radially outer position of the outer space to a radially inner position of the outer space, thereby transferring the kinetic energy from the filtrate to the outer casing, thereby permitting regaining of mechanical energy, and
   discharging the filtrate and the concentrate from the centrifugal filtering device, rotating the outer casing at the same rotational speed as the inner casing, and operating the device with intermittent rotational speeds ranging between:
   a high rotational speed that produces a centrifugal force sufficient to force the fluid through the filter, and
   a low rotational speed sufficiently low for the filtrate to flow from the radially outer position of the outer space towards the radially inner position of the outer space;
   at least a portion of the regaining of mechanical energy is regained during a reduction of rotational speed from the high rotational speed to the low rotational speed by means of an electrical generator or a mechanical regulation of the rotational speed.

* * * * *